(12) United States Patent
Arai

(10) Patent No.: US 11,599,341 B2
(45) Date of Patent: Mar. 7, 2023

(54) PROGRAM REWRITE DEVICE, STORAGE MEDIUM, AND PROGRAM REWRITE METHOD

(71) Applicant: FUJITSU LIMITED, Kawasaki (JP)

(72) Inventor: Masaki Arai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/242,192

(22) Filed: Apr. 27, 2021

(65) Prior Publication Data

US 2022/0012026 A1 Jan. 13, 2022

(30) Foreign Application Priority Data

Jul. 13, 2020 (JP) .............................. JP2020-119735

(51) Int. Cl.
*G06F 9/44* (2018.01)
*G06F 8/41* (2018.01)
*G06F 8/10* (2018.01)

(52) U.S. Cl.
CPC ................ *G06F 8/437* (2013.01); *G06F 8/10* (2013.01); *G06F 8/427* (2013.01); *G06F 8/433* (2013.01)

(58) Field of Classification Search
CPC ..................................................... G06F 8/433
USPC ...................................................... 717/143
See application file for complete search history.

(56) References Cited

U.S. PATENT DOCUMENTS

| | | | | |
|---|---|---|---|---|
| 9,104,474 B2 * | 8/2015 | Kaul | ...................... | G06F 7/5443 |
| 9,213,548 B2 * | 12/2015 | Chiba | ................. | G06F 9/30094 |
| 9,477,477 B2 * | 10/2016 | Dally | .................. | G06F 9/30025 |
| 11,036,504 B2 * | 6/2021 | Heinecke | ............... | G06F 9/3001 |
| 11,360,767 B2 * | 6/2022 | Kaul | ...................... | G06F 9/3001 |
| 11,361,496 B2 * | 6/2022 | Maiyuran | ............. | G06F 15/173 |
| 2004/0181567 A1 * | 9/2004 | Pappalardo | ............. | G06F 7/483 |
| | | | | 708/620 |
| 2009/0094308 A1 * | 4/2009 | Fit-Florea | ........... | G06F 7/49947 |
| | | | | 708/497 |
| 2011/0208474 A1 * | 8/2011 | Tanabiki | ............... | G01S 5/0226 |
| | | | | 702/150 |

(Continued)

FOREIGN PATENT DOCUMENTS

JP H02-165225 A 6/1990

OTHER PUBLICATIONS

Eva Darulova et al. "Sound Mixed-Precision Optimization with Rewriting"; 2018 9th ACM/IEEE International Conference on Cyber-Physical Systems—2018 IEEE.*

(Continued)

*Primary Examiner* — Francisco J Aponte
(74) *Attorney, Agent, or Firm* — Fujitsu Patent Center

(57) ABSTRACT

A program rewrite method executed by a computer, the method includes rewriting a program to output a first output group by performing operations for a first variable among a plurality of variables with a plurality of data types; rewriting the program to output a second output group by performing operations for a second variable among the plurality of variables with a plurality of data types; identifying, from the first output group and the second output group, a third output group that satisfied a predetermined criterion as a result of executing the rewritten programs; determining a data type that corresponds to the third output group as a use data type; and outputting a program in which the use data type is set for each of the plurality of variables.

5 Claims, 21 Drawing Sheets

(56) References Cited

U.S. PATENT DOCUMENTS

| | | | | |
|---|---|---|---|---|
| 2012/0259903 | A1* | 10/2012 | Kan | G06F 7/49947 |
| | | | | 708/497 |
| 2016/0092167 | A1* | 3/2016 | Rarick | G06F 7/49957 |
| | | | | 708/497 |
| 2018/0081633 | A1* | 3/2018 | Langhammer | G06F 7/485 |
| 2018/0268289 | A1* | 9/2018 | Wong | G06N 3/084 |
| 2019/0042193 | A1* | 2/2019 | Pasca | G06F 7/4876 |
| 2020/0042287 | A1* | 2/2020 | Chalamalasetti | G06N 3/0635 |
| 2020/0201608 | A1* | 6/2020 | Wallbaum | G06F 8/35 |
| 2020/0356622 | A1* | 11/2020 | Tsunoda | G06N 3/126 |

OTHER PUBLICATIONS

Cindy Rubio-Gonzalez, et al. "Precimonious: Tuning Assistant for Floating-Point Precision"; SC'13, Nov. 17-21, 2013, Denver, Colorado, USA.*

Harshitha Menon et al. "ADAPT: Algorithmic Differentiation Applied to Floating-Point Precision Tuning"; SC18, Nov. 11-16, 2018, Dallas, Texas, USA.*

Nhut-Minh Ho et al. "Efficient Floating Point Precision Tuning for Approximate Computing"; 2017 22nd Asia and South Pacific Design Automation Conference (ASP-DAC) IEEE.*

Extended European Search Report dated Oct. 13, 2021 for corresponding European Patent Application No. 21168877.5, 6 pages.

Chiang, Wei-Fan et al., "Rigorous Floating-Point Mixed-Precision Tuning", Principles of Programming Languages, ACM, 2 Penn Plaza, Suite 701, New York, NY 10121-0701 USA, XP058307969, DOI: 10.1145/3009837.3009846, ISBN: 978-1-4503-4660-3, pp. 300-315, Jan. 21, 2017.

Cherubin, Stefano et al., "Tools for Reduced Precision Computation: A Survey", ACM Computing Surveys, ACM, New York, NY, US, vol. 53, No. 2, XP058485605, ISSN: 0360-0300, DOI: 10.1145/3381039), pp. 1-35, Apr. 16, 2020.

* cited by examiner

FIG. 2

```
include <stdio.h> double fun (double x, double y)
{
  double result = x / y;
  return result;
} void main ()
{
  double input0 = read_input();
  double input1 = read_input();
  double input2 = read_input();
  double input3 = read_input();
  double a = input0 - input1;
  double b;
  if (a < 1.0) {
    double c = fun (input0, input2);
    b = c * a;
  } else {
    double d = fun (input1, input3);
    b = d * a;
  }
  double output = b / 2;
  printf ("%f%d", output);
}
```

| NAME | VARIABLE | ROW NUMBER | ALLOWABLE RANGE (MINIMUM VALUE) | ALLOWABLE RANGE (MAXIMUM VALUE) |
|---|---|---|---|---|
| c1 | c | 19 | -1.0 | 1.0 |
| c2 | d | 22 | -100.0 | 100.0 |
| c3 | output | 25 | -1000.0 | 1000.0 |

FIG. 4

| NAME | TYPE |
|---|---|
| input0 | double |
| input1 | double |
| input2 | double |
| input3 | double |
| x | double |
| y | double |
| result | double |
| a | double |
| b | double |
| c | double |
| d | double |
| output | double |

```
include <stdio.h> double fun (double x, double y)
{
  double result = x / y;
  return result;
} void main ()
{
  double input0 = read_input();
  double input1 = read_input();
  double input2 = read_input();
  double input3 = read_input();
  double a = input0 - input1;
  double b;
  if (a < 1.0) {
    double c = fun (input0, input2);
    #pragma AC checkpoint c1 c          ← 19TH ROW
    b = c * a;
  } else {
    double d = fun (input1, input3);
    #pragma AC checkpoint c2 d          ← 22ND ROW
    b = d * a;
  }
  double output = b / 2;
  #pragma AC checkpoint c3 output       ← 25TH ROW
  printf ("%f%d", output);
}
```

FIG. 6A

```
double v1 = v2 + v3;
```

FIG. 6B

```
struct ext_var {
  bool live_d;
  double d;
  bool live_f;
  float f;
  bool live_l;
  long int l;
  bool live_i;
  int i;
  bool live_s;
  short s;
  bool live_c;
  char c;
} ext_v1;
```

FIG. 6C

```
ext_v1.live_d = ext_v1.live_f = ext_v1.live_l = ext_v1.live_i =
ext_v1.live_s = ext_v1.live_c = false;
``` a1 {
```
if (ext_v2.live_d && ext_v3.live_d) {
   ext_v1.d = ext_v2.d + ext_v3.d;
   ext_v1.live_d = true;
}
``` a2 {
```
if (ext_v2.live_f && ext_v3.live_f) {
   ext_v1.f = ext_v2.f + ext_v3.f;
   ext_v1.live_f = true;
}
``` a3 {
```
if (ext_v2.live_l && ext_v3.live_l) {
   ext_v1.l = ext_v2.l + ext_v3.l;
   ext_v1.live_l = true;
}
``` a4 {
```
if (ext_v2.live_i && ext_v3.live_i) {
   ext_v1.i = ext_v2.i + ext_v3.i;
   ext_v1.live_i = true;
}
``` a5 {
```
if (ext_v2.live_s && ext_v3.live_s) {
   ext_v1.s = ext_v2.s + ext_v3.s;
   ext_v1.live_s = true;
}
``` a6 {
```
if (ext_v2.live_c && ext_v3.live_c) {
   ext_v1.c = ext_v2.c + ext_v3.c;
   ext_v1.live_c = true;
}
```

FIG. 7A

```
if (v2 < v3) {
  /* PROCESSING T */
} else {
  /* PROCESSING F */
}
```

FIG. 7B

```
bool cond_d = false;
bool cond_f = false;
bool cond_l = false;
bool cond_i = false;
bool cond_s = false;
bool cond_c = false;
⎧ if (ext_v2.live_d && ext_v3.live_d)    ⎫
⎪    cond_d = ext_v2.d < ext_v3.d;       ⎬ b11
⎪ if (ext_v2.live_f && ext_v3.live_f)    ⎭
⎪    cond_f = ext_v2.f < ext_v3.f;
⎪ if (ext_v2.live_l && ext_v3.live_l)
⎪    cond_l = ext_v2.l < ext_v3.l;
b1⎨ if (ext_v2.live_i && ext_v3.live_i)
⎪    cond_i = ext_v2.i < ext_v3.i;
⎪ if (ext_v2.live_s && ext_v3.live_s)
⎪    cond_s = ext_v2.s < ext_v3.s;
⎪ if (ext_v2.live_c && ext_v3.live_c)
⎩    cond_c = ext_v2.c < ext_v3.c;
if (fork ()) {
⎧   if (!cond_d)
⎪      ext_v2.live_d = ext_v3.live_d = false;
⎪   if (!cond_f)
⎪      ext_v2.live_f = ext_v3.live_f = false;
⎪   if (!cond_l)
⎪      ext_v2.live_l = ext_v3.live_l = false;
b2⎨   if (!cond_i)
⎪      ext_v2.live_i = ext_v3.live_i = false;
⎪   if (!cond_s)
⎪      ext_v2.live_s = ext_v3.live_s = false;
⎪   if (!cond_c)
⎩      ext_v2.live_c = ext_v3.live_c = false;
   check_ext_var(ext_v2);
   check_ext_var(ext_v3);
   /* PROCESSING T */
} else {
⎧   if (cond_d)
⎪      ext_v2.live_d = ext_v3.live_d = false;
⎪   if (cond_f)
⎪      ext_v2.live_f = ext_v3.live_f = false;
⎪   if (cond_l)
⎪      ext_v2.live_l = ext_v3.live_l = false;
b3⎨   if (cond_i)
⎪      ext_v2.live_i = ext_v3.live_i = false;
⎪   if (cond_s)
⎪      ext_v2.live_s = ext_v3.live_s = false;
⎪   if (cond_c)
⎩      ext_v2.live_c = ext_v3.live_c = false;
   check_ext_var(ext_v2);
   check_ext_var(ext_v3);
   /* PROCESSING F */
}
```

FIG. 8A

```
void foo (double vx) {
...
} void bar () {
...
100: foo(va);
...
200: foo(vb);
...
300: foo(vc);
...
}
```

FIG. 8B

```
struct arg_ext_var {
  bool line_100_p;
  struct ext_var ext_vx_1;
  bool line_200_p;
  struct ext_var ext_vx_2;
  bool line_300_p;
  struct ext_var ext_vx_3;
} ext_vx;
```

FIG. 9A

| NAME | VALUE |
|---|---|
| live_d | true |
| live_f | true |
| live_l | true |
| live_j | false |
| live_s | false |
| live_c | false |

FIG. 9B

| NAME | VALUE |
|---|---|
| live_d | false |
| live_f | false |
| live_l | false |
| live_j | false |
| live_s | false |
| live_c | false |

FIG. 10

| NAME | VALUE |
|---|---|
| live_d | true |
| live_f | true |
| live_l | true |
| live_i | false |
| live_s | false |
| live_c | false |

FIG. 11

| INPUT FILE a | |
|---|---|
| NAME | VALUE |
| live_d | true |
| live_f | true |
| live_l | true |
| live_i | false |
| live_s | false |
| live_c | false |

| INPUT FILE b | |
|---|---|
| NAME | VALUE |
| live_d | true |
| live_f | true |
| live_l | false |
| live_i | false |
| live_s | false |
| live_c | false |

FIG. 12

100TH ROW

| NAME | VALUE |
|---|---|
| live_d | true |
| live_f | true |
| live_l | false |
| live_i | false |
| live_s | false |
| live_c | false |

200TH ROW

| NAME | VALUE |
|---|---|
| live_d | true |
| live_f | false |
| live_l | false |
| live_i | false |
| live_s | false |
| live_c | false |

FIG. 13

```
void foo_100 (float w) {
  ...
}
```

```
void foo_200 (double w) {
  ...
}
```

```
void bar () {
...
100: foo(va);
...
200: foo(vb);
...
}
```
→
```
void bar () {
...
100: foo_100(va);
...
200: foo_200(vb);
...
}
```

FIG. 14

| NAME | TYPE | CALL POSITION |
|---|---|---|
| input0 | double | |
| input1 | double | |
| input2 | double | |
| input3 | double | |
| a | double | |
| b | float | |
| c | double | |
| d | float | |
| output | float | |
| x | double | 18 |
| y | double | 18 |
| result | double | 18 |
| x | float | 21 |
| y | float | 21 |
| result | float | 18 |

FIG. 15

```c
include <stdio.h> double fun1 (double x, double y)
{
  double result = x / y;
  return result;
} float fun2 (float x, float y)
{
  float result = x / y;
  return result;
} void main ()
{
  double input0 = read_input();
  double input1 = read_input();
  double input2 = read_input();
  double input3 = read_input();
  double a = input0 - input1;
  float b;
  if (a < 1.0) {
    double c = fun1 (input0, input2);
#pragma AC checkpoint c1 c
    b = c * a;
  } else {
    float d = fun2 (input1, input3);
#pragma AC checkpoint c2 d
    b = d * a;
  }
  float output = b / 2;
#pragma AC checkpoint c3 output
  printf ("%f%d", output);
}
```

PROGRAM REWRITE DEVICE, STORAGE MEDIUM, AND PROGRAM REWRITE METHOD

CROSS-REFERENCE TO RELATED APPLICATION

This application is based upon and claims the benefit of priority of the prior Japanese Patent Application No. 2020-119735, filed on Jul. 13, 2020, the entire contents of which are incorporated herein by reference.

FIELD

The present embodiment relates to a program rewrite device and the like.

BACKGROUND

In recent years, approximate computing technology for the purpose of speeding up program execution and reducing power consumption by changing strictness of the precision of program execution results within a range allowed by a user has been proposed. Adjustment of the precision of the approximate computing by reducing the number of bits of a data type used in the operation is one of methods of the AC technology.

In adjusting the precision of the approximate computing, appropriate selection of how much precision is applied to each data (variable) in the program is needed. For example, it is conceivable to try all combinations of the precision for all the data (variables) in the program. For example, Japanese Laid-open Patent Publication No. 2-165225 and the like are disclosed as related art.

SUMMARY

According to an aspect of the embodiments, a program rewrite method executed by a computer, the method includes rewriting a program to output a first output group by performing operations for a first variable among a plurality of variables with a plurality of data types; rewriting the program to output a second output group by performing operations for a second variable among the plurality of variables with a plurality of data types; identifying, from the first output group and the second output group, a third output group that satisfied a predetermined criterion as a result of executing the rewritten programs; determining a data type that corresponds to the third output group as a use data type; and outputting a program in which the use data type is set for each of the plurality of variables.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of program information;

FIG. 3 is a diagram illustrating an example of allowable precision information;

FIG. 4 is a diagram illustrating an example of variable set information;

FIG. 5 is a diagram illustrating an example of program information to which checkpoints are added;

FIG. 6A is a diagram illustrating an example of an addition code;

FIG. 6B is a diagram illustrating an example of variable extension;

FIG. 6C is a diagram illustrating an example of rewriting addition;

FIG. 7A is a diagram illustrating an example of a condition branch code;

FIG. 7B is a diagram illustrating an example of rewriting a condition branch;

FIG. 8A is a diagram illustrating an example of a function call code;

FIG. 8B is a diagram illustrating another example of variable extension;

FIG. 9A is a diagram illustrating an example of a condition set of extended variables on a true side of a condition branch;

FIG. 9B illustrates an example of a condition set of the extended variables on a false side of the condition branch;

FIG. 10 is a diagram illustrating an example of a condition set at a checkpoint;

FIG. 11 is a diagram illustrating an example of a condition set of extended variables for an input file;

FIG. 12 is a diagram illustrating an example of a condition set of extended variables for function arguments;

FIG. 13 is a diagram illustrating an example of adjusting the function arguments;

FIG. 14 is a diagram illustrating an example of set information of adjusted variables;

FIG. 15 is a diagram illustrating an example of adjusted program information;

DESCRIPTION OF EMBODIMENTS

However, the number of data in the program is enormous, and it is not realistic to try all the combinations of the precision for all the data in the program. That is, there is a problem that it takes time to obtain an optimum combination of the precision for every plurality of data in the program.

In view of the foregoing, it is desirable to shorten the time to obtain the optimum combination of the precision for every plurality of data in the program.

Embodiments of an information processing device, an information processing program, and an information processing method disclosed in the present application will be described in detail with reference to the drawings below. Note that the present invention is not limited to the embodiment.

EMBODIMENTS

Functional Configuration of Information Processing Device

According to Embodiment

Figure 1:
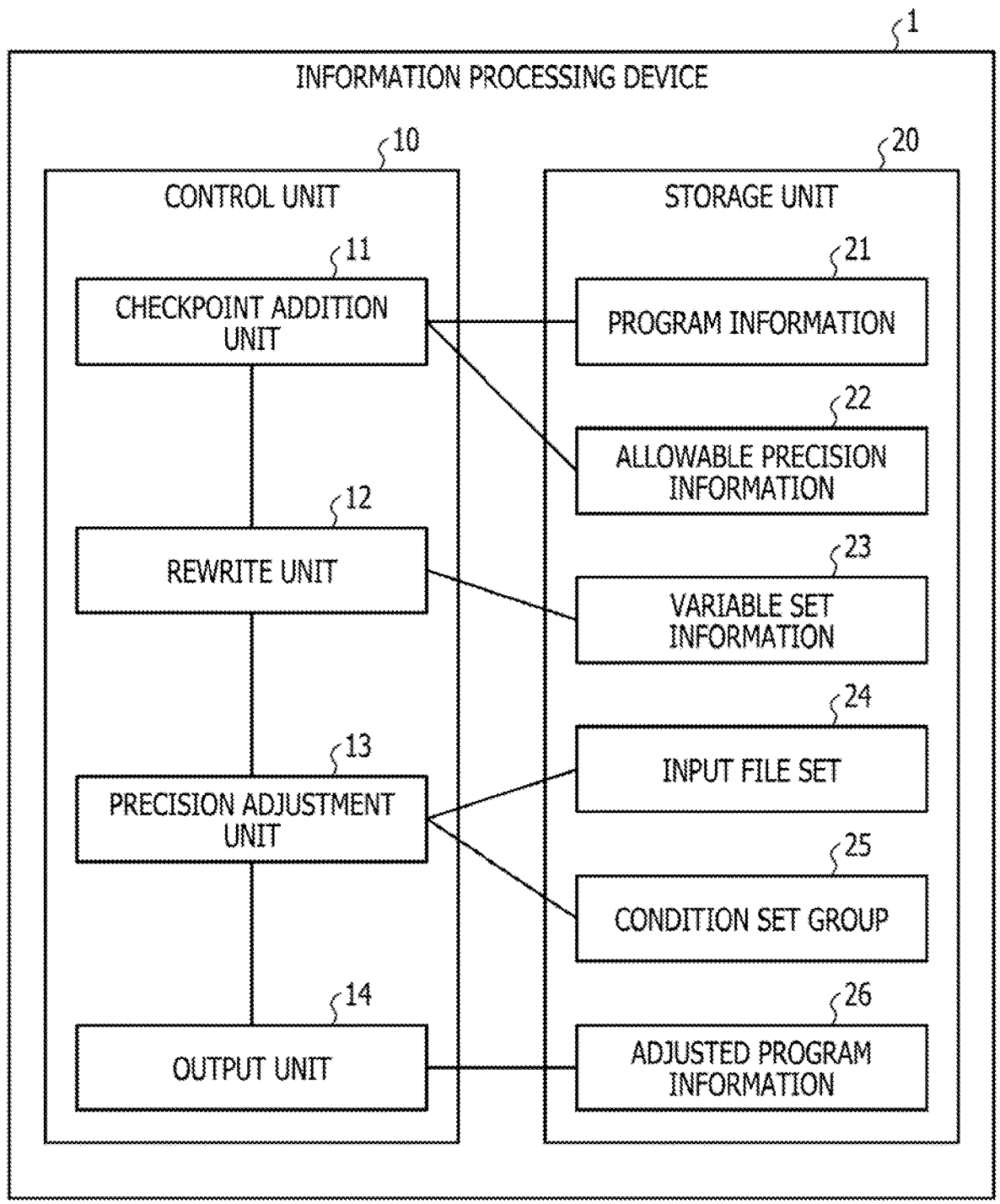
FIG. 1 is a block diagram illustrating a functional configuration of an information processing device according to an embodiment.

FIG. 1 is a block diagram illustrating a functional configuration of an information processing device according to an embodiment. An information processing device 1 illustrated in FIG. 1 adjusts an optimum data type for each variable of a program having a plurality of variables. For example, the information processing device 1 rewrites the program to output a first output group by performing operations for a first variable among the plurality of variables with a plurality of data types. The information processing device 1 rewrites the program to output a second output group by performing operations for a second variable among the plurality of variables with a plurality of data types. As a result of executing the rewritten programs, the information processing device 1 selects a third output group that satisfies an allowable range from the first output group and the second output group, and determines a data type corresponding to the third output group as a use data type. Then, the information processing device 1 outputs a program in which the use data type is set for every plurality of variables. The first output group referred to here means information as to whether a field of each data type is alive in a case where the first variable uses the plurality of data types, and a value of the variable in the case where the field of each data type is alive. The second output group referred to here means information as to whether a field of each data type is alive in a case where the second variable uses the plurality of data types, and a value of the variable in the case where the field of each data type is alive. Here, the case where the field of each data type is not alive means, for example, a case where a digit overflow or the like occurs in a case where a value is set in the field of each data type.

The information processing device 1 includes a control unit 10 and a storage unit 20. The control unit 10 corresponds to an electronic circuit such as a central processing unit (CPU). Then, the control unit 10 includes an internal memory for storing programs defining various processing procedures and control data, and executes various types of processing using the programs and the control data. The control unit 10 includes a checkpoint addition unit 11, a rewrite unit 12, a precision adjustment unit 13, and an output unit 14. Note that the rewrite unit 12 is an example of a first rewrite unit and a second rewrite unit. The precision adjustment unit 13 is an example of a determination unit. The output unit 14 is an example of an output unit.

The storage unit 20 is, for example, a semiconductor memory device such as a random access memory (RAM) or a flash memory, or a storage device such as a hard disk or an optical disk. The storage unit 20 includes program information 21, allowable precision information 22, variable set information 23, input file set 24, a condition set group 25, and adjusted program information 26.

The program information 21 is a source code of a program. The program information 21 is a source code of a program having a plurality of variables and for which data types of the plurality of variables are adjusted. Here, an example of the program information 21 will be described with reference to FIG. 2.

FIG. 2 is a diagram illustrating an example of program information. As illustrated in FIG. 2, the program information 21 represents a source code of a target program. The program information 21 includes a plurality of variables such as input0, input1, input2, input3, a, b, c, d, and output. In the embodiment, the data types of these variables are adjusted. Among these variables, values read from an input file are set in the input % input1, input2, and input3. Furthermore, the input0, input1, input2, and input3 are variables of an argument of a function fun. In the embodiment, the data types of the variables of the argument are adjusted, and in a case where the data types of the variables of the argument are different depending on call positions of the function fun, the function fun is adjusted according to the data type of the variable of the argument.

Returning to FIG. 1, the allowable precision information 22 is information of allowable precision of a checkpoint added to the program information 21. The checkpoint here is processing of checking whether the value of the variable satisfies the allowable precision. Here, an example of the allowable precision information 22 will be described with reference to FIG. 3.

FIG. 3 is a diagram illustrating an example of allowable precision information. As illustrated in FIG. 3, the allowable precision information 22 is information associating a name, a variable, a row number, an allowable range (minimum value), and an allowable range (maximum value) with one another. The name is a name that defines a checkpoint. The variable is a variable for which the checkpoint is performed. The row number is a position where the checkpoint is performed, and represents a position in the source code of the program indicated by the program information 21. The allowable range (minimum value) indicates a minimum value of an allowable range as an error. The allowable range (maximum value) indicates a maximum value in the allowable range as an error.

As an example, when the name is "c1", the allowable range of the value of the variable c located at the row number "19" is defined as "−1.0" as the minimum value and "1.0" as the maximum value.

Returning to FIG. 1, the variable set information 23 is information indicating a set of variables included in the program indicated by the program information 21. Note that the variable set information 23 is generated using, for example, a compiler technique. Here, an example of the variable set information 23 will be described with reference to FIG. 4.

FIG. 4 is a diagram illustrating an example of the variable set information. As illustrated in FIG. 4, a set of variables is illustrated. The set of variables is the plurality of variables included in the program indicated by the program information 21 illustrated in FIG. 2. The variable set information 23 is information associating the name and the type with each other. The name represents the name of the variable. The type represents the data type. In the example of FIG. 4, the type of all the variables represented by the names is set to "double".

Returning to FIG. 1, the input file set 24 is a set of files input when the program indicated by the program information 21 is executed. Each input file in the input file set 24 includes initial values to be input to one or more variables included in the program.

The condition set group 25 is a group of condition sets corresponding to variables. The condition set corresponding to a variable is a set of information indicating whether the field of each data type is alive in the case where a plurality of data types is used for the variable. As an example, in the case where the data types are "double", "float", and "long" for a certain variable, "true" representing that the field of each data type is alive is set. In the case where the data types are "int", "short", and "char", "false" representing that the field of each data type is not alive is set. The "double" referred here can store an 8-byte double-precision floating-point real number value. The "float" can store a 4-byte single-precision floating-point real number value. The "long" can store a 8-byte signed integer value. The "int" can store a 4-byte signed integer value. The "short" can store a 2-byte signed integer value. The "char" can store a 1-byte signed integer value, Note that the condition set group 25 is generated for each variable by the precision adjustment unit 13 to be described below.

The adjusted program information 26 is program information after the variables included in the program indicated by the program information 21 are adjusted. The adjusted program information 26 is output by the output unit 14 to be described below. Note that an example of the adjusted program information 26 will be described below.

The checkpoint addition unit 11 adds checkpoints to the program information 21. For example, the checkpoint addition unit 11 generates program information to which checkpoints are added from the program information 21 and the allowable precision information 22 of the variables. As an example, the checkpoint addition unit 11 extracts the variables, the row numbers, and the allowable ranges described in the allowable precision information 22. The checkpoint addition unit 11 adds, for each extracted variables, an instruction of a checkpoint for checking whether the allowable range is satisfied to the position of the row number of the program information 21.

Here, an example of the program information 21 to which checkpoints are added will be described with reference to FIG. 5. FIG. 5 is a diagram illustrating an example of the program information to which checkpoints are added. The program information 21 to which checkpoints are added illustrated in FIG. 5 is generated from the allowable precision information 22 in FIG. 3. As illustrated in FIG. 5, the instruction of the checkpoint for the variable c is added to the 19th row. The instruction of the checkpoint for the variable d is added to the 22nd row. The instruction of the checkpoint for the variable output is added to the 25th row. When the process of the program information 21 reaches the instruction of the checkpoint, the checkpoint checks whether the target variable satisfies the allowable range associated with the variable.

Returning to FIG. 1, the rewrite unit 12 rewrites the program information 21 to output the first output group by performing operations for the first variable among the plurality of variables with the plurality of data types. Furthermore, the rewrite unit 12 rewrites the program information 21 to output the second output group by performing operations for the second variable among the plurality of variables with the plurality of data types. That is, the rewrite unit 12 rewrites the program information 21 to output a condition set by performing operations for each variable among the plurality of variables with the plurality of data types. For example, the rewrite unit 12 analyzes the program information 21 and generates a set of a plurality of variables (variable set information 23) for adjusting calculation precision. Then, the rewrite unit 12 rewrites the program information 21 so as to simultaneously perform calculation for the set of variables with each precision (data type). Note that the analysis of the program information may be performed using a compiler technique.

As an example, rewriting of an addition code in the case where an addition instruction is coded in the program information 21 will be described with reference to FIGS. 6A to 6C. FIG. 6A is a diagram illustrating an example of the addition code. As illustrated in FIG. 6A, consider a case where the addition code is "double v1=v2+v3". That is, a value indicating a result of adding the variable v2 and the variable v3 is set in the variable v1 of the data type double. That is, since the variable v1 has the data type of double, the 8-byte double-precision floating-point real number value can be stored.

The rewrite unit 12 extends the variable v1 with respect to a plurality of data types that are targets of approximation results. FIG. 6B is a diagram illustrating an example of the variable extension. As illustrated in FIG. 6B, the variable v1 is extended to a variable illustrated by ext_v1. The extended variable v1 (ext_v1) has the fields of double, float, long, int, short, and char as the data types, and has Boolean fields each capable of storing the value as to whether the field is alive when each data type is used.

Since the variable set information 23 of the addition code "v1=v2+v3" includes the variables v2 and v3 in addition to the variable v1, the variables v2 and v3 are assumed to be similarly expanded to the variable v1. Then, the rewrite unit 12 rewrites the addition code "v1=v2+v3" so as to simultaneously perform calculation for the set of variables (v1, v2, and v3) with each precision (data type). FIG. 6C is a diagram illustrating an example of rewriting addition. As illustrated in FIG. 6C, the addition code "v1=v2+v3" is rewritten so as to simultaneously perform calculation with each data type. For example, in the case where the variables v1, v2, and v3 are of the double data type, the part indicated by reference numeral a1 is rewritten so that the part can be calculated with the double type. That is, if the Boolean variable values of the extended variable v2 and the extended variable v3 are both values (true) indicating that both fields are alive, the addition code can be calculated with the double type, and the calculated value is set in d of the extended variable v1 (ext_v1). Moreover, the value (true) indicating that the field is alive is set in live_d of the extended variable v1 (ext_v1). Note that if the Boolean variable value(s) of either one or both of the extended variable v2 and the extended variable v3 is a value indicating that the field is not alive (false), the lived of the extended variable v1 (ext_v1) is a value (false) indicating that the field is not alive, which has been set as the initial value.

Similarly, in the case where the variables v1, v2, and v3 are of the float data type, the part indicated by reference numeral a2 is rewritten so that the part can be calculated with the float type. Furthermore, in the case where the variables v1, v2, and v3 are of the long data type, the part indicated by reference numeral a3 is rewritten so that the part can be calculated with the long type. Furthermore, in the case where the variables v1, v2, and v3 are of the int data type, the part indicated by reference numeral a4 is rewritten so that the part can be calculated with the int type. Furthermore, in the case where the variables v1, v2, and v3 are of the short data type, the part indicated by reference numeral a5 is rewritten so that the part can be calculated with the short type. Furthermore, in the case where the variables v1, v2, and v3 are of the char data type, the part indicated by reference numeral a6 is rewritten so that the part can be calculated with the char type. That is, the rewrite unit 12 rewrites the addition code illustrated in FIG. 6A into an addition code of simultaneously processing addition of a plurality of data types to be approximated.

Figure 7A:
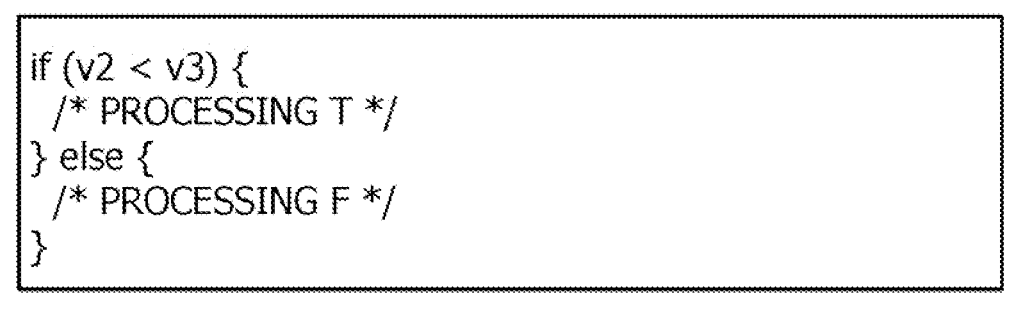

As another example, rewriting of a condition branch code in the case where a condition branch instruction is coded in the program information 21 will be described with reference to FIGS. 7A and 7B. FIG. 7A is a diagram illustrating an example of the condition branch code. As illustrated in FIG. 7A, in a case where the condition branch code is "if (v2<v3)", processing T is executed, or processing F is executed otherwise.

It is assumed that the variables v2 and v3 used in the condition branch code are extended to the extended variables. Then, the rewrite unit 12 rewrites the condition branch code so as to simultaneously perform calculation for the set of variables (v2 and v3) with each precision (data type). FIG. 7B is a diagram illustrating an example of rewriting a condition branch. As illustrated by reference numeral b1 in FIG. 7B, the condition branch code is rewritten so that comparison can be performed with the respective data types and a plurality of condition determination results can be simultaneously calculated. For example, in the case where the variables v2 and v3 are of the double data type, the part indicated by reference numeral b11 is rewritten so that comparison can be performed with the double type and the condition determination results can be calculated. That is, if the Boolean variable values of the extended variable v2 and the extended variable v3 are both values (true) indicating that both fields are alive, the condition comparison code of "v2<v3" can be compared with the double type and the condition comparison result is set in variable cond_d. When the condition comparison result is true, the value "1" indicating true is set in the variable cond_d. When the condition comparison result is false, the value "0" indicating false is set in the variable cond_d.

Furthermore, the rewrite unit 12 rewrites the program information 21 to copy an execution process in the case of executing the program information 21 after condition determination to two execution processes on the true side and the false side. Here, fork ( ) is a copy instruction. Then, in the process on the true side, the rewrite unit 12 rewrites the program information 21 to set the value (false) indicating that the field is not alive in the Boolean variable value of each data type of the extended variables v2 and v3 in order to stop use of the false data type, as illustrated by reference code b2. Meanwhile, in the process on the false side, the rewrite unit 12 rewrites the program information 21 to set the value (false) indicating that the field is not alive in the Boolean variable value of each data type of the extended variables v2 and v3 in order to stop use of the true data type, as illustrated by reference code b3. The rewrite unit 12 rewrites the program to copy the process and use parallel processing as described above, thereby shortening the time to obtain a result as compared with a case of checking one candidate at a time of variables for which approximate computing precision is adjusted.

For example, in the case where the variables v2 and v3 are of the double data type and the variable cond_d is the value "1" indicating true, the process will execute the following processing. That is, the process sets "false" in live_d of the extended variable v2 (ext_v2) and live_d of the extended variable v3 (ext_v3) in order to stop the use of the double data type that becomes true on the false side indicated by reference numeral b3. Meanwhile, in the case where the variables v2 and v3 are of the long data type and the variable cond_l is the value "0" indicating false, the process executes the following processing. That is, the process sets "false" in live_l of the extended variable v2 (ext_v2) and lived of the extended variable v3 (ext_v3) in order to stop the use of the long data type that becomes false on the true side indicated by reference numeral b2.

Here, the function check_ext_var ( ) added to the true side and false side of the rewrite results is a function that checks the presence of a living field (Boolean variable value) in the extended variables of the argument. If the argument extended variable has no alive fields, the process is terminated as a failure.

As another example, rewriting of a function call code in the case where a function instruction is coded in the program information 21 will be described with reference to FIGS. 8A and 8B. FIG. 8A is a diagram illustrating an example of the function call code, Consider a case where the function call code is "void foo (double vx)" as illustrated in FIG. 8A. That is, the data type of a parameter of a function foo indicates double. That is, since a variable vx of the parameter of the function foo has the data type of double, an 8-byte double-precision floating-point real number value can be stored.

The rewrite unit 12 extends the variable vx with respect to a plurality of data types that are targets of approximation results. FIG. 8B is a diagram illustrating another example of variable extension. As illustrated in FIG. 8B, the variable vx is extended to a variable illustrated by ext_vx. To call the function foo, the Boolean variable according to the row number at the call position is simply set to true, and an extended variable struct ext_var corresponding to the call position is used. Note that struct ext_var refers to the variable extension illustrated in FIG. 6B. For example, to call foo from the position of the 100th row, line_100_p is simply set to true and line_200_p and line_300_p are simply set to false, and ext_vx_1 is used as the extended variable.

Returning to FIG. 1, the precision adjustment unit 13 outputs the first output group and the second output group as a result of executing the program of the rewritten program information 21. Furthermore, the precision adjustment unit 13 selects the third output group that satisfies a predetermined criterion from the first output group and the second output group, and adjusts the data type corresponding to the third output group as the use data type.

For example, the precision adjustment unit 13 starts executing the program of the program information 21 rewritten so as to add a checkpoint and use the extended variable. At this time, the precision adjustment unit 13 inputs one input file included in the input file set 24 into the program information 21.

Then, the precision adjustment unit 13 simultaneously performs calculation for each of the variables included in the variable set information 23 with a plurality of data types according to the execution of the program, and outputs a condition set for each of the variables. Then, the precision adjustment unit 13 checks the value of the living field by referring to the condition set of the checkpoint variable in the condition set group 25, and selects the data type of each living field having the value that satisfies the allowable range of the checkpoint. In addition, for variables other than checkpoints, the precision adjustment unit 13 refers to the condition set for the variables and selects the data type of the living field for each variable. Then, the precision adjustment unit 13 determines the data type selected for each variable as the use data type. Note that there are some cases where a plurality of data types is selected for one variable. In such cases, the precision adjustment unit 13 simply selects a data type having the smallest number of bits.

The output unit 14 outputs adjusted program information. For example, the output unit 14 generates the adjusted program information using the use data type for each variable, and outputs the adjusted program information 26.

Here, execution of the program of the rewritten program information 21 performed by the precision adjustment unit 13 will be described. Note that the variables of the rewritten program information 21 are extended to the extended variables.

Here, it is assumed that a process ID of the program information 21 is P1000. Then, it is assumed that a procedure RUN (P1000) is executed as running of the program information 21. After reading one input file in the input file set 24 by a read_input function, RUN (P1000) first calculates a subtraction code of "double a=input0−input1". Note that input0, input1, and a are extended to extended variables.

Next, RUN (P1000) generates a process P1000$_f$ that becomes false depending on a comparison result of the extended variable a in the execution of the condition branch code of "if (a<1.0) { . . . } else { . . . }". Here, the condition set on the true side of the condition branch of the extended variable a shall be illustrated in FIG. 9A. The condition set on the false side of the condition branch of the extended variable a shall be illustrated in FIG. 9B.

Note that FIG. 9A is a diagram illustrating an example of the condition set of the extended variables on the true side of the condition branch. FIG. 98 illustrates an example of the condition set of the extended variables on the false side of the condition branch. Names and types are associated with the condition sets illustrated in FIGS. 9A and 98. The name represents a name corresponding to the data type. For example, live_d corresponds to the double data type. live_f corresponds to the float data type. live_l corresponds to the long data type. live_i corresponds to the int data type. live_s corresponds to the short data type live_c corresponds to the char data type. Furthermore, the type represents information indicating whether the field of the variable is alive in the case where the data type is used for the variable. For example, "true" indicating that the field is alive and "false" indicating that the field is not alive are stored in the type.

Next, RUN (P1000) proceeds with the processing on the true side and reaches a checkpoint c1 after calling the function fun. Then, RUN (P1000) then checks the allowable range of the value of the extended variable c at the reached position. Here, it is assumed that the extended variable c is the state of the condition set illustrated in FIG. 10. FIG. 10 is a diagram illustrating an example of a condition set at a checkpoint. As illustrated in FIG. 10, live_d, live_f, and live_l are set to "true" indicating that they are alive. That is, the fields of the double data type, float data type, and long data type indicate that they are alive.

Therefore, RUN (P1000) checks the values of the living fields of the data types and checks whether the value of each field falls within the allowable range of the checkpoint. Here, it is assumed that the value of the field of the long data type is out of the allowable range (error) as a result of the check. Then, RUN (P1000) sets the type of live_l corresponding to long in the condition set of the extended variable c to "false". Then, RUN (P1000) then continues execution. If all the fields are in error at this stage, RUN (P1000) terminates the process execution as an error.

Then, it is assumed that RUN (P1000) proceeds with processing, passes all the checkpoints, and reaches the end of the program execution. Then, RUN (P1000) then outputs information of the living fields of the data types for all the extended variables and terminates the process.

Note that, as illustrated in FIG. 9B, RUN (P1000$_f$) terminates the process execution as an error because the condition set on the false side of the condition branch of the extended variable a is "false" in the all data type fields.

By applying a plurality of input files included in the input file set 24 to the execution of such a process, the precision adjustment unit 13 can acquire information of the precision of a plurality of variables for which the precision of approximate computing is adjusted. The precision adjustment unit 13 can guarantee the precision by selecting the data type having the smallest number of bits for each variable from the acquired precision information of the plurality of variables. For example, in the case where the input file a is applied to the extended variable x, the condition set as illustrated in the left figure of FIG. 11 is obtained, and in the case where the input file b is applied to the extended variable x, the condition set as illustrated in the right figure of FIG. 11 is obtained. Then, the precision adjustment unit 13 selects the float indicating the data type of the field that is alive in both the condition sets and has the smallest number of bits.

Furthermore, the precision adjustment unit 13 can guarantee the precision for each call position of the function by individually processing the variable of the argument of the function for each call position of the function. For example, in the case where the extended variable w of the argument of the function foo is called from the 100th row, the condition set as illustrated in the left figure of FIG. 12 is obtained, and in the case where the extended variable w is called from the 200th row, the condition set as illustrated in the right figure of FIG. 12 is obtained. Then, the precision adjustment unit 13 selects the float indicating the data type of the field that is alive and has the smallest number of bits in the case where the extended variable of the argument of the function is called from the 100th row. Furthermore, the precision adjustment unit 13 selects the double indicating the data type of the field that is alive and has the smallest number of bits in the case where the extended variable of the argument of the function is called from the 200th row.

After that, the output unit 14 rewrites the name of the function foo called from the 100th row to foo_100 and rewrites the data type of the argument w to float as illustrated in the upper figure of FIG. 13. Furthermore, the output unit 14 copies the function foo called from the 200th row, rewrites the name of the copied function foo to foo_200 and rewrites the data type of the argument w to double as illustrated in the middle figure of FIG. 13. Then, the output unit 14 rewrites the call positions of the 100th and 200th rows to the names of the respective functions. Here, as illustrated in the lower figure of FIG. 13, in the 100th row, the name foo of the function at the call position is rewritten to foo_100. In the 200th row, the name foo of the function at the call position is rewritten to foo_200. As a result, the output unit 14 can increase the chances of applying adjustment of the precision of the approximate computing by generating a copy of the function according to the situation of the call position of the function.

Here, the set information of the variables as a result of adjustment by the precision adjustment unit 13 and the adjusted program information 26 generated from the adjusted results will be described with reference to FIGS. 14 and 15. FIG. 14 is a diagram illustrating an example of the set information of variables as a result of adjustment. As illustrated in FIG. 14, the data type adjusted as the use data type by the precision adjustment unit 13 is set in the type for the variable indicated by the name. Here, the data types of the variables b, d, output, and x and y at the call position of 21 have been adjusted to the float although the data type of each of the variables is the double in the variable set information 23 illustrated in FIG. 4.

FIG. 15 is a diagram illustrating an example of the adjusted program information. The adjusted program information 26 illustrated in FIG. 15 is rewritten from the program information 21 illustrated in FIG. 2 by using the set information of the variables as a result of adjustment illustrated in FIG. 14. Specifically, in the adjusted program information 26, the data types of the variables b, d, and output are adjusted to the float. In the adjusted program information 26, the name of the function fun on the 18th row is rewritten to fun1, and the name of the function fun on the 21st row is rewritten to fun2. Then, in the adjusted program information 26, the name of the function fun called from the 18th row is rewritten to fun1. Then, in the adjusted program information 26, the name of the function fun called from the 21st row is rewritten to fun2, and the data types of the arguments x and y are adjusted to the float.

As a result, the precision adjustment unit 13 can shorten the time to obtain an optimum combination of precision for every plurality of variables in the program information 21 as compared with the case of checking one candidate at a time of the variables for which the precision of the approximate computing is adjusted. Furthermore, the precision adjustment unit 13 can expand the range of application of the approximate computing by copying a part of the functions of the program information 21.

Flowchart of Precision Adjustment Processing

Figure 16:
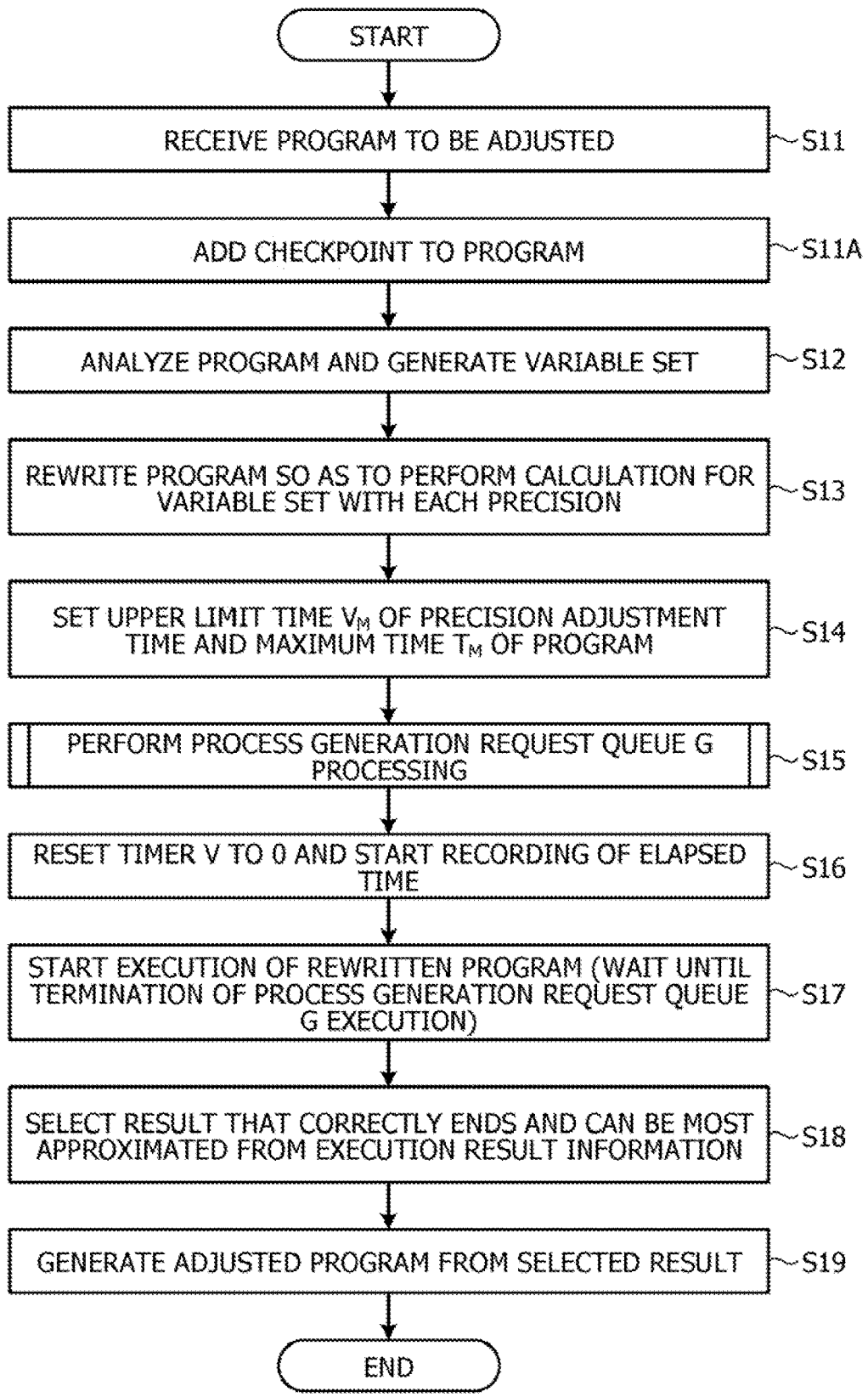
FIG. 16 is a diagram illustrating an example of a flowchart of precision adjustment processing according to the embodiment.

FIG. 16 is a diagram illustrating an example of a flowchart of precision adjustment processing according to the embodiment. Note that the program illustrated in FIG. 16 corresponds to the program information 21.

As illustrated in FIG. 16, the checkpoint addition unit 11 receives the program information 21 to be adjusted (step S11). The checkpoint addition unit 11 generates program information 21 to which checkpoints are added from the program information 21 and the allowable precision information 22 of the variables (step S11A).

Then, the rewrite unit 12 analyzes the program information 21 and generates the variable set information 23 (step S12). Then, the rewrite unit 12 rewrites the program information 21 so as to simultaneously perform calculation for the variable set of the variable set information 23 with each precision (data type) (step S13). For example, the rewrite unit 12 rewrites the program information 21 so as to simultaneously perform calculation for each of the variables in the variable set of the variable set information 23 with each precision (data type) by using the extended variables.

Then, the precision adjustment unit 13 sets an upper limit time $V_M$ of the precision adjustment time and a maximum time $T_M$ of the program of the program information 21 (step S14). The upper limit time $V_M$ of the precision adjustment time refers to the upper limit time of the time needed for checking the combination of precision in the variable set of the variable set information 23. The maximum time $T_M$ of the program of the program information 21 refers to the maximum time in the execution of the program of the program information 21. The maximum time $T_M$ of the program of the program information 21 may be determined by executing the program of the program information 21.

Then, the precision adjustment unit 13 executes processing of a request queue G (step S15). The request queue G is a queue used to process a request for process execution. Note that the flowchart of the request queue processing will be described below.

Then, the precision adjustment unit 13 resets a timer V to 0, starts recording of elapsed time, and starts execution of the rewritten program information 21 (steps S16 and S17). For example, the precision adjustment unit 13 executes the procedure RUN (Q) with the process ID of Q of the program information 21 rewritten so as to add a checkpoint and use the extended variable, and waits until the execution of the request queue G is terminated.

Then, the precision adjustment unit 13 selects the result that correctly ends and can be most approximated from the information of the execution result (step S18). For example, the precision adjustment unit 13 refers to the condition set group 25 in all the extended variables and acquires the data type information of the living field for each extended variable. Then, the precision adjustment unit 13 selects the data type having the smallest number of bits from the acquired information for each extended variable.

Then, the output unit 14 generates the adjusted program from the selected result (step S19). For example, the output unit 14 adjusts the program information 21 using the data type selected for each extended variable as the use data type, and generates the adjusted program information 26. Then, the precision adjustment processing ends.

Flowchart of Request Queue Processing

Figure 17:
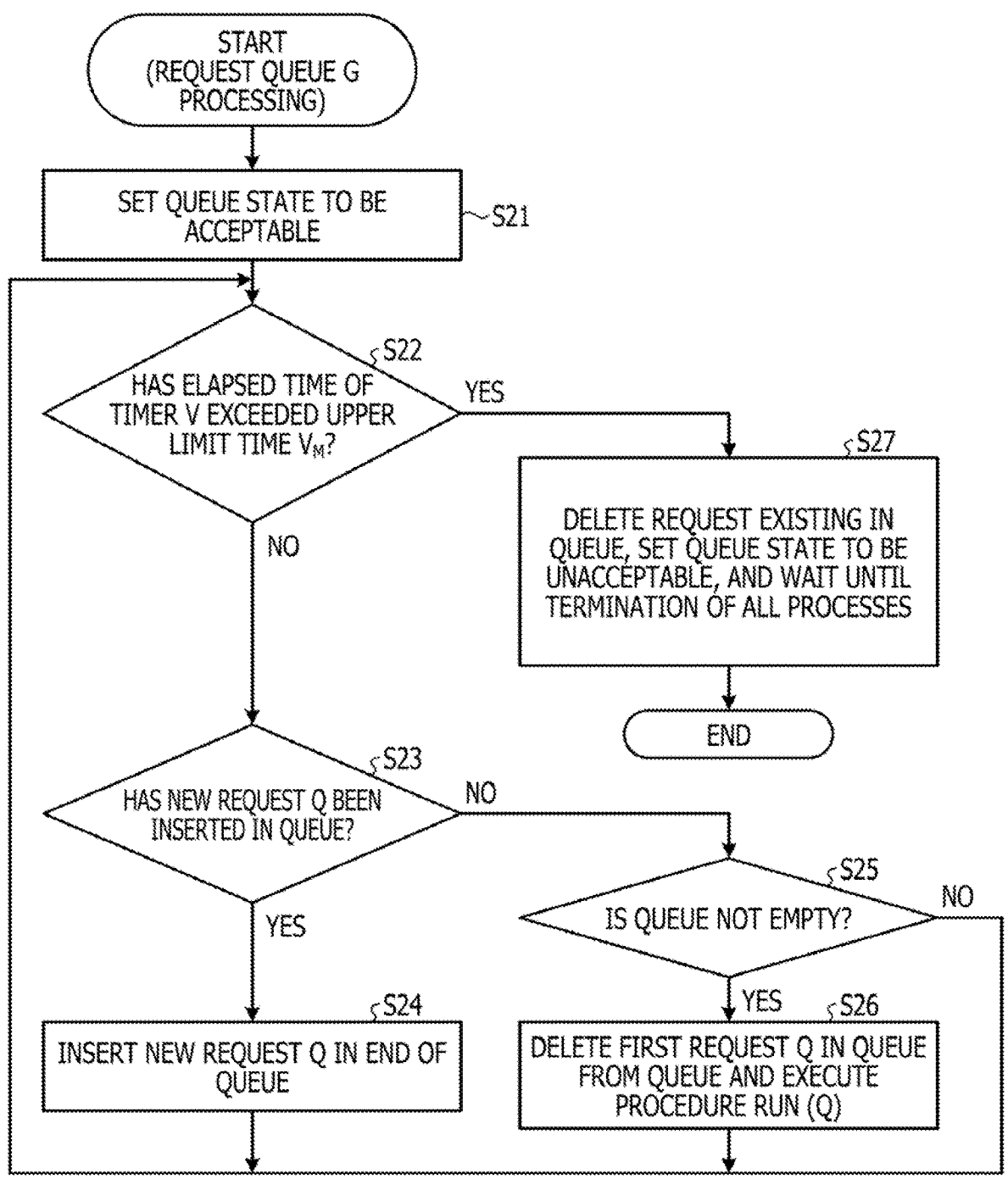
FIG. 17 is a diagram illustrating an example of a flowchart of request queue processing.

FIG. 17 is a diagram illustrating an example of a flowchart of the request queue processing. As illustrated in FIG. 17, the request queue G processing sets a queue state to be acceptable (step S21). Then, the request queue G processing determines whether the elapsed time of the timer V has exceeded the upper limit time $V_M$ (step S22).

In the case of determining that the elapsed time of the timer V has not exceeded the upper limit time $V_M$ (step S22; No), the request queue G processing determines whether a new request Q has been inserted in the queue (step S23). In the case of determining that a new request Q has been inserted in the queue (step S23; Yes), the request queue G processing inserts the new request Q in the end of the queue (step S24). Then, the processing of the request queue G proceeds to step S22.

Meanwhile, in the case of determining that the new request Q has not been inserted in the queue (step S23; No), the request queue G processing determines whether the queue is empty (step S25). In the case of determining that the queue is empty (step S25; No), the request queue G processing proceeds to step S22.

In the case of determining that the queue is not empty (step S25; Yes), the request queue G processing deletes the first request Q in the queue from the queue and executes the procedure RUN (Q) (step S26). Then, the processing of the request queue G proceeds to step S22.

In step S22, in the case of determining that the elapsed time of the timer V has exceeded the upper limit time $V_M$ (step S22; Yes), the request queue G processing deletes the request existing in the queue. Then, the request queue G processing sets the queue state to be unacceptable and waits until all the processes are terminated (step S27). Then, the request queue G processing ends when all the processes are terminated.

Flowchart of Procedure RUN (Q) Processing

Figure 18:
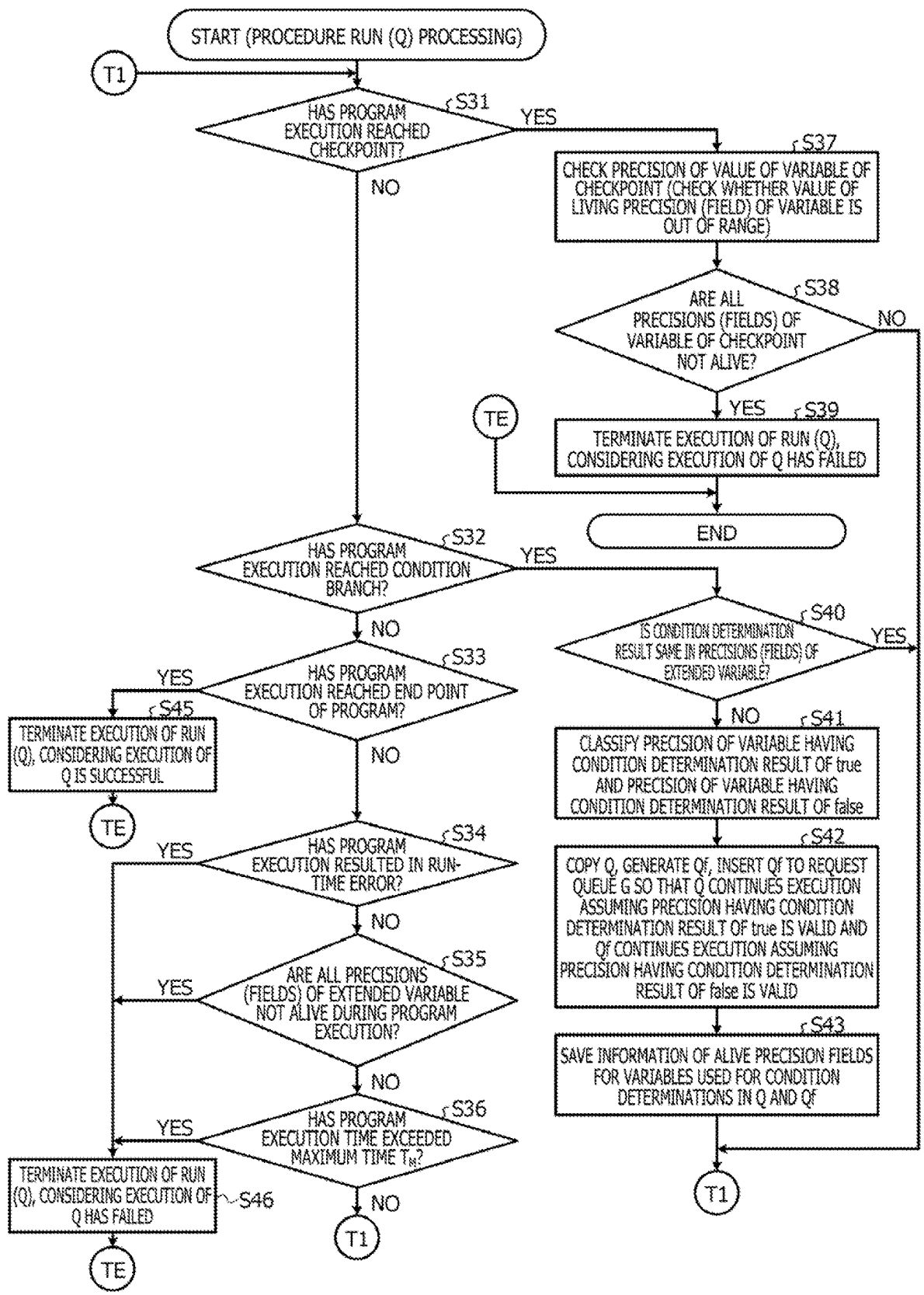
FIG. 18 is a diagram illustrating an example of a flowchart of procedure RUN (Q) processing.

FIG. 18 is a diagram illustrating an example of a flowchart of procedure RUN (Q) processing. Note that Q is the process ID of the program of the rewritten program information 21.

As illustrated in FIG. 18, the procedure RUN (Q) determines whether the program execution has reached a checkpoint (step S31). In the case of determining that the program execution has reached the checkpoint (step S31; Yes), the procedure RUN (Q) proceeds to step S37.

On the other hand, in the case of determining that the program execution has not reached the checkpoint (step S31; No), the procedure RUN (Q) determines whether the program execution has reached a condition branch (step S32). In the case of determining that the program execution has reached the condition branch (step S32; Yes), the procedure RUN (Q) proceeds to step S40.

On the other hand, in the case of determining that the program execution has not reached the condition branch (step S32; No), the procedure RUN (Q) determines whether the program execution has reached an end point of the program (step S33). In the case of determining that the program execution has reached the end point of the program (step S33; Yes), the procedure RUN (Q) terminates the execution of the RUN (Q), considering that the execution of Q is successful (step S45), Then, the procedure RUN (Q) processing ends.

On the other hand, in the case of determining that the program execution has not reached the end point of the program (step S33; No), the procedure RUN (Q) determines whether the program execution has resulted in a run-time error (step S34). In the case of determining that the program execution has resulted in a run-time error (step S34; Yes), the procedure RUN (Q) proceeds to step S46.

On the other hand, in the case of determining that the execution of the program has not resulted in a run-time error (step S34; No), the procedure RUN (Q) determines whether all the precision fields of the extended variable are alive during the execution of the program (step S35). In the case of determining that all the precision fields of the extended variable are not alive (step S35; Yes), the procedure RUN (Q) proceeds to step S46.

On the other hand, in the case of determining that there is an alive precision field of the extended variable (step S35; No), the procedure RUN (Q) determines whether the execution time of the program has exceeded the maximum time $T_M$ (step S36). In the case of determining that the program execution time has exceeded the maximum time $T_M$ (step S36; Yes), the procedure RUN (Q) proceeds to step S46.

On the other hand, in the case of determining that the program execution time has not exceeded the maximum time $T_M$ (step S36; No), the procedure RUN (Q) proceeds to step S31 to advance the execution.

In step S46, the procedure RUN (Q) terminates the execution of RUN (Q), considering that the execution of Q has failed (step S46). Then, the procedure RUN (Q) processing ends.

In step S37, procedure RUN (Q) checks the precision of the value of the variable of the checkpoint using the allowable precision information 22 (step S37). That is, the procedure RUN (Q) checks whether the value of the alive precision field of the variable of the checkpoint is out of the allowable range using the allowable precision information 22. Then, the procedure RUN (Q) determines whether all the precision fields of the variable of the checkpoint are alive (step S38). In the case of determining that the procedure RUN (Q) determines that all the precision fields of the variable of the checkpoint are not alive (step S38; Yes), the procedure RUN (Q) terminates the execution of the RUN (Q), considering that the execution of Q has failed (step S39). Then, the procedure RUN (Q) processing ends.

On the other hand, in the case of determining that there is an alive precision field of the variable of the checkpoint (step S38; No), the procedure RUN (Q) proceeds to step S31 to advance the execution.

In step S40, the procedure RUN (Q) determines whether the condition determination result (for example, true or false) is the same in each of the precision fields of the extended variable (step S40). In the case of determining that the condition determination result is the same in the precision fields of the extended variable (step S40; Yes), the procedure RUN (Q) proceeds to step S31 in order to advance the execution.

On the other hand, in the case of determining that the condition determination result is not the same in each of the precision fields of the extended variable (step S40; No), the procedure RUN (Q) classifies the precision field of the variable in which the condition determination result is true and the precision field of the variable in which the condition determination result is false (step S41). Then, the procedure RUN (Q) copies the process Q to generate a process $Q_f$. The procedure RUN (Q) inserts the process $Q_f$ into the request queue G so that the process Q continues execution assuming that the precision having the condition determination result of true is valid, and the process $Q_f$ continues execution assuming that the precision having the condition determination result of false is valid (step S42).

Then, the procedure RUN (Q) saves the information of the respective precision fields that are alive at the present stage in the condition sets for the variables used for the respective condition determinations in the process Q and the process $Q_f$ (step S43). Then, the procedure RUN (Q) proceeds to step S31 to advance the execution.

Note that, in the case of using an unknown input file for the adjusted program information 26 as a result of adjusting the precision, there are some cases where the variable as a checkpoint causes an error outside the allowable range. In such a case, the precision adjustment unit 13 executes the program of the program information 21 rewritten so as to add the checkpoint and use the extended variable, using the unknown input file again. Then, the precision adjustment unit 13 can obtain the condition set that has caused the error at the checkpoint of the error. Then, the precision adjustment unit 13 selects precision not causing an error using the condition set, thereby promptly obtaining the adjusted program information 26 as a new result guaranteeing the precision of the approximate computing result for the input file set 24 known at the present stage.

Effect of Embodiment

According to the above-described embodiment, the information processing device 1 rewrites the program to output the first output group by performing operations for the first variable among the plurality of variables included in the program with the plurality of data types. The information processing device 1 rewrites the program to output the second output group by performing operations for the second variable among the plurality of variables with the plurality of data types. As a result of executing the rewritten programs, the information processing device 1 selects the third output group that satisfies the predetermined criterion from the first output group and the second output group, and determines the data type corresponding to the third output group as the use data type. Then, the information processing device 1 outputs the program in which the use data type is set for every plurality of variables. With the configuration, the information processing device 1 can shorten the time to obtain the optimum combination of precision (data types) for every plurality of variables by rewriting the program to perform the operations with the plurality of data types and executing the rewritten program, for the plurality of variables included in the program.

Furthermore, according to the above-described embodiment, the predetermined criterion is a criterion of determination processing of determining whether or not the calculation results of the first variable obtained from the first output group and the second variable obtained from the second output group fall within the predetermined error range. As a result, the information processing device 1 can quickly determine the use data type by executing the program once by using the criterion of the determination processing when determining the use data type.

Furthermore, according to the above-described embodiment, the information processing device 1 further rewrites the program to perform the condition branch determination with the plurality of data types in the case of the condition branch code. The information processing device 1 rewrites the program to be able to copy the execution process to two execution processes on the true branch side and the false branch side in the case of executing the program after the condition branch determination. The information processing device 1 rewrites the program to stop use of the data type in which the condition branch determination becomes false in the process on the true branch side and to stop use of the data type in which the condition branch determination becomes true in the process on the false branch side. With the configuration, the information processing device 1 can shorten the time to obtain the optimum combination of precision for every plurality of variables in the program as compared with the case of checking one candidate at a time of the variables for which the precision of the approximate computing is adjusted, by rewriting the program to use parallel execution of the process.

Furthermore, according to the above-described embodiment, the information processing device 1 changes the name of the function at the call position according to the situation of the use data type at the call position of the function, and outputs the program to which the function is added in accordance with the name of the function. With the configuration, the information processing device 1 can expand the range of application of the approximate computing by copying a part of the functions of the program.

Others

Note that each component of the information processing device 1 is not necessarily physically configured as illustrated in the drawings. In other words, specific aspects of separation and integration of the information processing device 1 are not limited to the illustrated ones, and all or a part of the device can be functionally or physically separated and integrated in an arbitrary unit according to various loads, use states, or the like. For example, the rewrite unit 12 may be distributed to a first rewrite unit that rewrites the operation code, a second rewrite unit that rewrites the condition branch code, and a third rewrite unit that rewrites the function call code. Furthermore, the precision adjustment unit 13 and the output unit 14 may be integrated as one unit. Furthermore, the storage unit 20 may be connected via a network as an external device of the information processing device 1.

Figure 19:
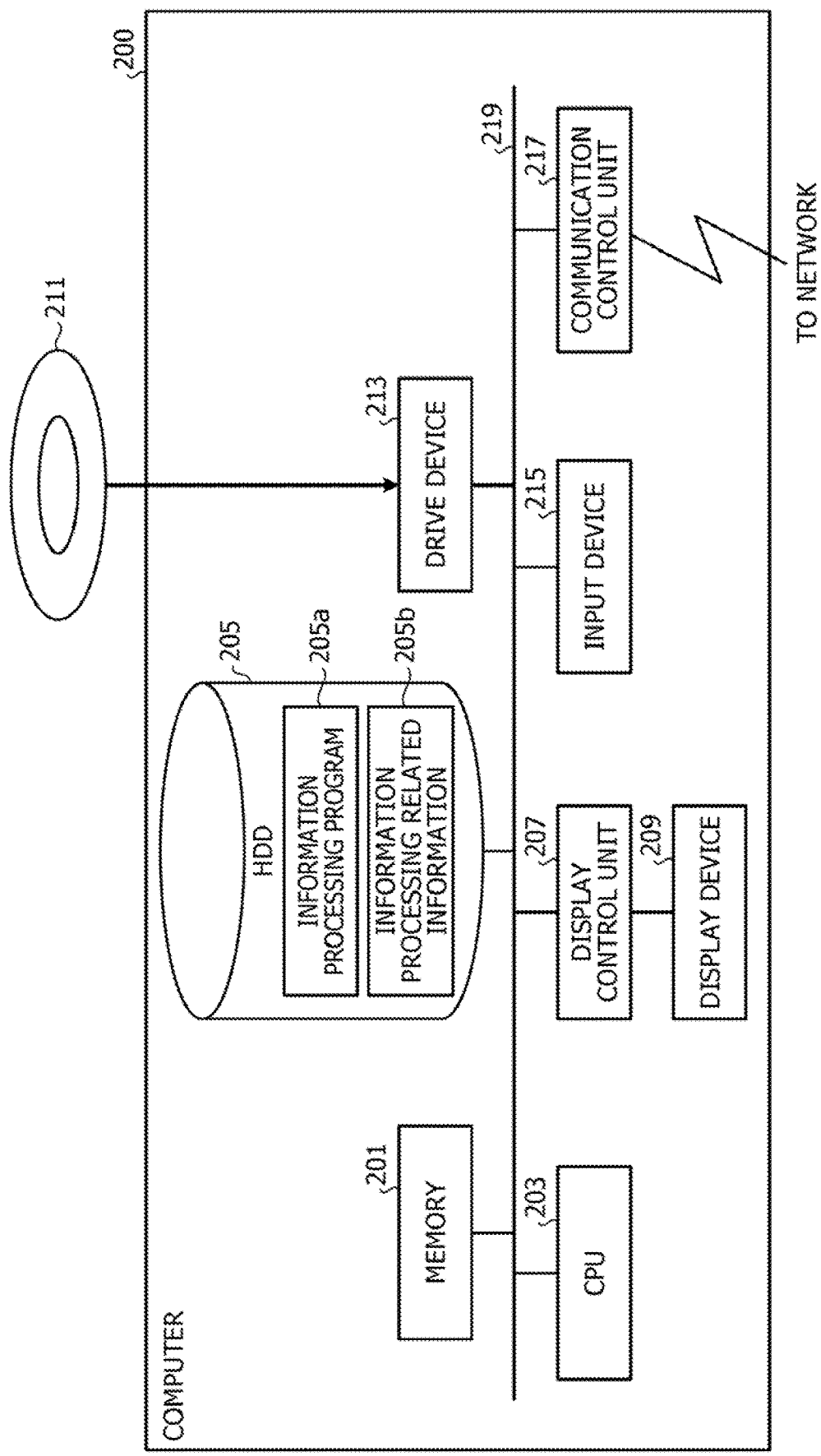
FIG. 19 is a diagram illustrating an example of a computer for executing an information processing program.

Furthermore, various types of processing described in the above embodiment can be achieved by a computer such as a personal computer or a work station executing programs prepared in advance. Therefore, in the following description, an example of the computer which executes an analysis program implementing functions similar to the information processing device 1 illustrated in FIG. 1 will be described. FIG. 19 is a diagram illustrating an example of a computer for executing an information processing program.

As illustrated in FIG. 19, a computer 200 includes a CPU 203 that executes various types of calculation processing, an input device 215 that accepts data input from a user, and a display control unit 207 that controls a display device 209. Furthermore, the computer 200 includes a drive device 213 that reads a program and the like from a storage medium, and a communication control unit 217 that exchanges data with another computer via a network. Furthermore, the computer 200 includes a memory 201 that temporarily stores various types of information, and an HDD 205. Then, the memory 201, the CPU 203, the HDD 205, the display control unit 207, the drive device 213, the input device 215, and the communication control unit 217 are connected by a bus 219.

The drive device 213 is, for example, a device for a removable disk 211. The HDD 205 stores an information processing program 205a and information processing related information 205b.

The CPU 203 reads the information processing program 205a, loads the information processing program 205a into the memory 201, and executes the information processing program 205a as a process. Such a process corresponds to the respective functional units of the information processing device 1. The information processing related information 205b corresponds to the program information 21, allowable precision information 22, variable set information 23, input file set 24, condition set group 25, and adjusted program information 26. Then, for example, the removable disk 211 stores each piece of information such as the information processing program 205a.

Note that the information processing program 205a may not necessarily be stored in the HDD 205 from the beginning. For example, the program may be stored in a "portable physical medium" such as a flexible disk (FD), a CD-ROM, a DVD disk, a magneto-optical disk, or an IC card inserted in the computer 200. Then, the computer 200 may read the information processing program 205a from these media to execute the information processing program 205a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A program rewrite device, comprising:
a memory; and
a processor coupled to the memory and the processor configured to:
rewrite a program to output a first output group by performing operations for a first variable among a plurality of variables with a plurality of data types,
rewrite the program to output a second output group by performing operations for a second variable among the plurality of variables with a plurality of data types,
identify, from the first output group and the second output group, a third output group that satisfied that calculation results of the first variable obtained from the first output group and the second variable obtained from the second output group fall within a predetermined error range as a result of executing the rewritten programs, determine a data type that corresponds to the third output group as a use data type, output a program in which the use data type is set for each of the plurality of variables, rewrite the program to perform condition branch determination with a plurality of data types, rewrite the program to be able to copy an execution process to two execution processes on a true branch side and on a false branch side in a case of executing the program after the condition branch determination, and rewrite the program to stop use of a data type in which the condition branch determination becomes false in the process on the true branch side, and to stop use of a data type in which the condition branch determination becomes true in the process on the false branch side.

2. The program rewrite device according to claim 1, wherein the processor configured to:

change a name of a function at a call position according to the use data type at the call position of the function; and output the program to which the function is added in accordance with the name of the function.

3. A non-transitory computer-readable storage medium storing a program that causes a computer to execute a process, the process comprising:

rewriting a program to output a first output group by performing operations for a first variable among a plurality of variables with a plurality of data types;

rewriting the program to output a second output group by performing operations for a second variable among the plurality of variables with a plurality of data types;

identifying, from the first output group and the second output group, a third output group that satisfied that calculation results of the first variable obtained from the first output group and the second variable obtained from the second output croup fall within a predetermined error range as a result of executing the rewritten programs;

determining a data type that corresponds to the third output group as a use data type;

outputting a program in which the use data type is set for each of the plurality of variables;

rewriting the program to perform condition branch determination with a plurality of data types;

rewriting the program to be able to copy an execution process to two execution processes on a true branch side and on a false branch side in a case of executing the program after the condition branch determination; and rewriting the program to stop use of a data type in which the condition branch determination becomes false in the process on the true branch side, and to stop use of a data type in which the condition branch determination becomes true in the process on the false branch side.

4. A program rewrite method executed by a computer, the method comprising:

rewriting a program to output a first output group by performing operations for a first variable among a plurality of variables with a plurality of data types;

rewriting the program to output a second output group by performing operations for a second variable among the plurality of variables with a plurality of data types;

identifying, from the first output group and the second output group, a third output group that satisfied that calculation results of the first variable obtained from the first output group and the second variable obtained from the second output group fall within a predetermined error range as a result of executing the rewritten programs;

determining a data type that corresponds to the third output group as a use data type;

outputting a program in which the use data type is set for each of the plurality of variables;

rewriting the program to perform condition branch determination with a plurality of data types;

rewriting the program to be able to copy an execution process to two execution processes on a true branch side and on a false branch side in a case of executing the program after the condition branch determination; and rewriting the program to stop use of a data type in which the condition branch determination becomes false in the process on the true branch side, and to stop use of a data type in which the condition branch determination becomes true in the process on the false branch side.

5. The program rewrite method according to claim 4, wherein the method comprising:

changing a name of a function at a call position according to a situation of the use data type at the call position of the function; and outputting the program to which the function is added in accordance with the name of the function.

* * * * *